United States Patent Office 3,372,954
Patented Mar. 12, 1968

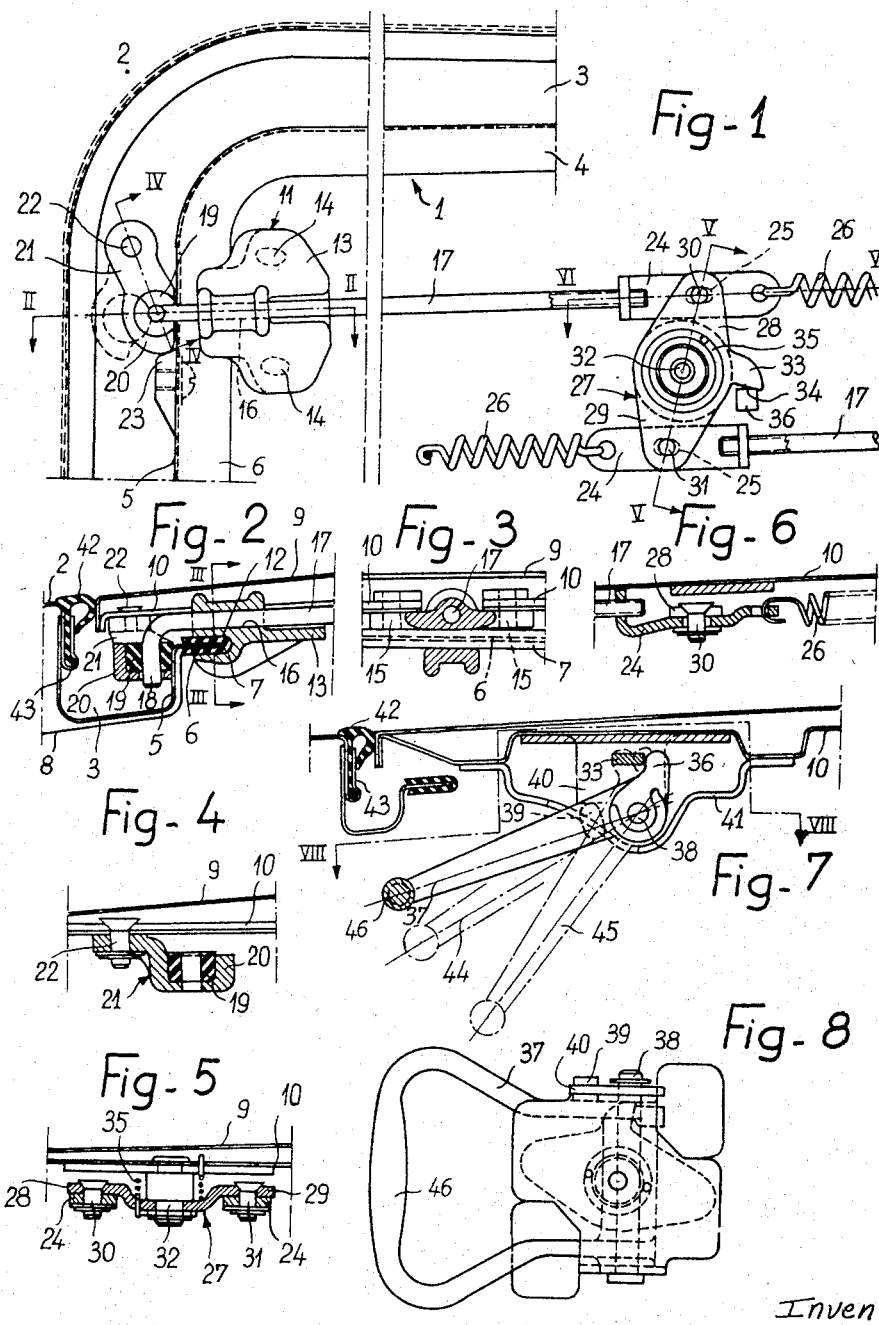

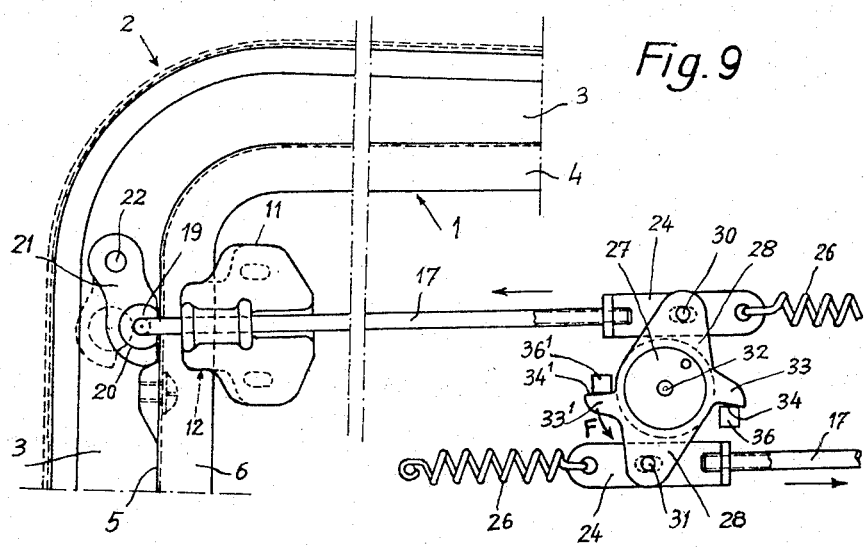

3,372,954
SLIDING ROOFS OF VEHICLES AND CONTROL AND LOCKING DEVICE THEREFOR
Gaëtan de Coye de Castelet, Billancourt, France, assignor to Regie Nationale des Usines Renault, Billancourt, France
Filed Mar. 17, 1966, Ser. No. 535,177
Claims priority, application France, Apr. 8, 1965, 12,479, Patent 1,439,226; Oct. 13, 1965, 34,838, Patent 89,956
8 Claims. (Cl. 296—137)

ABSTRACT OF THE DISCLOSURE

A sliding roof for closing an aperture formed in the roof of a vehicle. The sliding roof is slidably mounted between two parallel slideways provided on opposite sides of the aperture and is equipped with lock members. The slideways each consists of an angle iron having a first substantially vertical flange having an upper portion connected to a second flange directed towards the center of said aperture. The sliding roof is provided with a plurality of slide members having a slot therein for slidably engaging with said second flange. At least one slide member on each side of the roof is formed with a guide passage each having a lock rod slidably engaging therewith. The end of the lock rods disposed in the vicinity of the center of the aperture are connected to the lock control device secured to the roof. The other ends of said rods extend over the angle iron and form depending lock bolt terminal portions having fitted thereon rubber or plastic blocks disposed level with the first flange. The locking rods are guided by the slide member so that tractive force exerted on said rods by said control device towards the center of the aperture will press the blocks against the first flange of the two angle irons.

---

This invention relates to sliding roofs of vehicles and has specific reference to the control and locking devices therefore.

It is known, for an aperture formed in the roof of a vehicle, to provide a movable roof adapted to slide in the direction of its longitudinal center line between two slideways disposed on two opposite sides of the aperture. These roofs are equipped with locking members actuated by a control device comprising a control handle.

The roof slideways according to this invention consist each of an angle-iron comprising a first, substantially vertical flange connected at its upper portion to another flange directed towards the center line of the vehicle. The sliding roof proper comprises slide members having formed therein a slot slidably engaged by said other flange of the angle-iron of the corresponding lateral slideway. At least one slide member on either side of the roof comprises a guide passage slidably engaged by a lock rod extending over the angle-irons. One end of this lock rod which is located in the vicinity of the center line of the vehicle is connected to the control device mounted beneath the roof and the other end of said rod which extends over said angle-iron comprises a depending, lock-bolt forming terminal portion carrying a rubber or plastic block lying level with the first flange aforesaid. Both lock rods are so guided by said slide members that when the former are pulled by the control device towards the center line said blocks are pressed against said first flanges of their relevant angle-iron slideways.

Most of the component elements of the mechanism according to this invention can be manufactured from flat blanks or stock parts disposed in substantially horizontal planes. Thus, one of the essential features of this invention is that it permits the construction of relatively shallow sliding-roof structures.

This invention also comprises other constructional details as will appear clearly from the following description of a specific form of embodiment of a sliding roof constructed according to the teachings of this invention.

In this description given by way of example only reference will be made to the accompanying drawings in which:

FIGURE 1 is a fragmentary plan view showing the locking system of this invention, the roof being removed to simplify the drawing;

FIGURE 2 is a vertical section showing the slideway and one section of the lock, the section being taken along the line II—II of FIGURE 1 with the roof mounted in position;

FIGURE 3 is a detail sectional view showing a slide member engaged on the slideway, the section being taken along the line III—III of FIGURE 2;

FIGURE 4 is a sectional view showing a lock arm, the section being taken along the line IV—IV of FIGURE 1;

FIGURE 5 is another section, taken along the line V—V of FIGURE 1, showing the control rocker;

FIGURE 6 illustrates in sectional view the pivotal mounting of the lock rod on the control rocker of FIGURES 1 and 5, the section being taken along the line VI—VI of FIGURE 1;

FIGURES 7 and 8 are a sectional view and a plane view respectively showing the control handle, the section of FIGURE 8 being taken along the line VIII—VIII of FIGURE 7;

FIGURE 9 is a fragmentary plane view from above showing a modified form of embodiment of the sliding-roof lock system of this invention, and FIGURE 10 shows on a larger scale the control handle contemplated for this alternate form of embodiment.

Referring first to FIGURE 1, this figure shows the front portion of the frame of an aperture 1 formed in the roof 2 of an automotive vehicle for mounting a sliding roof, as well as part of the locking system in its closed position, the sliding roof proper being removed.

This frame, of which the cross-sectional contour and structure are shown in FIGURE 2, comprises a channel 3 having a lip 4 formed along its inner edge.

Along the lateral sides of the frame, that is, those extending parallel to the direction of travel of the sliding roof and to the center line thereof, this inner edge acts as a slideway consisting of an angle-iron comprising a first vertical flange 5 and another, substantially horizontal flange 6 forming said lip 4. This flange 6 has fitted thereon a plastic strip 7 for fastening the upholstery 8 lining the interior of the vehicle roof 2.

The sliding roof comprises an outer panel 9 having secured thereto through any suitable means an inner panel 10 (see FIGURES 2 to 5 and 7).

A slide member 11 disposed on either side of the roof comprises a slot 12 slidably engaged by said strip 7 of flange 6. This slide member 11 includes a base plate 13 in which two oval holes 14 (see FIGURE 1) are formed to permit the passage of screws 15 for securing the member 11 to the inner panel 10 of the sliding roof (FIGURE 3). The oval shape of holes 14 affords an easy adjustment of the sliding roof position in relation to the slideways. A guide hole 16 is formed in each slide member 11 for the passage of a lock rod 17.

One end of each lock rod 17 extends over the relevant slide member 11 and has a depending bent terminal portion 18 constituting a lock bolt carrying a cylindrical rubber or plastic block 19 fitted in a cup 20 formed at one end of an arm 21 having its other end pivoted to the inner panel 10 of the roof by means of a pin 22. The lock bolt 18 extends not only through the block 19 but also through the bottom of said cup 20, the latter having formed therein a lateral aperture through which said block projects in front of the first flange 5 of the slideway (FIGURES 1, 2 and 4). The pin 22 is disposed ahead of cup 20 in the roof closing direction and sufficiently spaced from the first flange 5 to cause the arm 21 to extend obliquely in relation to the flange 5 when the block 19 is pressed thereagainst and against a stop 23 secured to the first flange 5 of the slideway (FIGURE 1).

In the vicinity of the center line of the roof each rod 17 is secured by screwing (to permit their longitudinal adjustment) in a corresponding link 24 in which a central elongated hole 25 is formed.

Two traction springs 26 attached at one end to the sliding roof and at the other end to the corresponding link 24 constantly urge the blocks 19 against the aforesaid first flange 5 of the relevant slideway (FIGURES 1 and 6).

Each link 24 is fulcrumed on one arm of a control rocker 27 having two opposite arms 28, 29 by means of a pivot pin 30, 31 engaging the corresponding elongated hole 25 formed to this end in each link. This rocker 27 is fulcrumed on a substantially vertical pivot pin 32, rigid with the sliding roof, and comprises a lateral lug 33 formed with a substantially radial bearing face 34 (FIGURES 1 and 5).

A coil torsion spring 35 attached to said control rocker 27 and to the inner panel 10 of the sliding roof constantly urges the rocker 27 for rotation so as to press said bearing face 34 against a cam member 36 rigid with a control lever 37 comprising a handle 46. This control lever 37 is pivotally mounted on a substantially horizontal pin 38 extending at right angles to the center line of the roof. In the closed position, the control lever and its handle extend substantially in the roof closing direction. In this position, the upward travel of the control lever is limited by a projection 39 formed integrally on the lever and engaging a stop 40 secured to the inner panel 10 (FIGURES 7 and 8).

The control lever 37 and its cam 36 are so designed that lowering the lever from the uppermost position in which the blocks 19 are pressed against the flanges 5 of the corresponding slideways by the traction springs 26 will tilt the cam member 36 which, by acting on the lateral lug 33, rotates the control rocker 27 against the force of springs 26, thus moving the blocks 19 away from flanges 5 through the medium of lock rods 17 sliding in slide members 11.

Of course, the sliding roof is guided not only on either side and at the front by the slide members 11, of this invention but also at the rear with the assistance of any known and suitable guide means. Of course, slide members similar to those utilized at the front may be used for guiding the rear portion of the roof.

The control and lock system of this invention may be protected partially or wholly by means of a case such as 41 engaging the inner panel 10 (FIGURE 7).

On the other hand, the joint between the sliding roof and its frame in the fixed roof is sealed by fitting flexible weatherstrips such as 42 secured to the fixed portion by lugs or clamps 43 formed integrally in the sheet-metal constituting the fixed roof 2 (FIGURES 2 and 7).

The operation of the device of this invention will now be described, it being assumed that the sliding roof is initially in the open position wherein the control lever 39 is raised and the blocks 19 are pressed on either side of the roof against the flanges 5 of the slideways.

To close the roof the control lever 37 is lowered to position 44 or 45 shown in chain-dotted lines in FIGURE 7 and the movable assembly is pulled by means of this lever to its closed position. As cam 36 has rotated the control rocker 27 to pull the lock rods 17 and thus move the blocks 19 away from flanges 5 of the lateral slideways, the roof will easily slide to its closed position. The arms 21, on clearing the stops 23, are thereby moved outwards and after the control handle 46 has been released these arms 21 are urged by springs 26 to their normal position so that at the end of the travel their blocks 19 reengage the flanges 5 of the slideways. The wedging of arms 21 by stop members 23 and flanges 5 will thus prevent any subsequent backward movement of the sliding roof.

To open the roof, the handle 46 is moved from its upper position to its lowermost position 45 with an effort corresponding to that necessary for moving the sliding roof. Thus, cam 36 rotates the control rocker 27 which moves the arms 21 and their blocks 19 out from their wedged position, and the sliding roof can thus be moved to the desired open position in which the control handle 46 and lever 37 are subsequently released. The control lever 37 will then move upwards due to the tension of spring 35 and springs 26 pressing the blocks 19 against the flanges 5 of the slideways thus holding the sliding roof in the selected position.

To move the sliding roof from one intermediate position to another, it is only necessary to lower the control handle to position 44 and thus release the blocks 19.

The provision of elongated holes 25 on links 24 provides a certain lost motion for the control lever 37 and therefore affords a proper closing of the sliding roof without requiring an accurate fitting of the component elements of the control mechanism.

In the alternate form of embodiment illustrated in FIGURES 9 and 10 of the drawing the control rocker 27 has two opposite lugs 33 and $33^1$ having substantially radial bearing faces, respectively 34 and $34^1$, inverted to each other and located at a relative angular spacing of about 160°.

The control lever 37, instead of comprising a single cam member 36, incorporates a second cam member $36^1$. Both cam members 36 and $36^1$ are carried by a pivot pin $37^1$ rigid with lever 37 and suitably shifted to each other so as to engage respectively the bearing faces 34 and $34^1$ of control rocker 27, projections 39 and $39^1$ on said control lever 37 engaging a fixed portion to limit the permissible angular movements of this lever.

The relative arrangement of control lever 37 and cams 36 and $36^1$ is such that when the former is either lowered for pulling backwards and opening the sliding roof, or raised for pushing and closing same, the control rocker 27 is rotated in the direction of the arrow F, thus actuating the rods 17 and therefore the lock blocks 19, as the arms 21 rotate about their pivots 22 to free the flanges 5 of the slideways from the braking action exerted by said blocks 19.

It will be noted that the control lever 37 is held in its stable inoperative position by the engagement of its cam members 36 and $36^1$ with the bearing faces 34 and $34^1$ of control rocker 27.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A sliding roof for closing an aperture formed in the roof of a vehicle comprising a pair of parallel slideways provided on opposite sides of said aperture and extending parallel to the direction of movement of said sliding roof, a sliding roof panel disposed in said slideways and extending therebetween, a control locking device mounted on said panel, said slideways each comprising an angle iron having a substantially vertical first flange, a second flange connected to the upper edge of said first flange and being directed towards the center of said aperture, a plurality of slide members mounted on each side of said roof panel, said slide members having a slot therein for engaging with said second flange, locking rod means having one end operatively connected to said control locking device, the other end of said rod means extending over said angle irons and having a depending lock bolt terminal portion, resilient blocks disposed on a level with said first flanges and being mounted on said lock bolt terminal portions, arms pivotally mounted on one end to said roof at a point ahead of said blocks in the roof closing direction, said blocks being secured to the free ends of said arms, stop means secured on said first flange at the level of a path followed by the free ends of said arms during the roof sliding movement, the relative spacing on one hand between said first flange and the pivot point of said arm and on the other hand between said pivot point and the stop, when the free end has been moved to a point beyond said stop and the roof and its control locking device are in their closed position, being such that in the last-named position said arms have their free ends wedged against said stops to prevent the roof from being opened.

2. A sliding roof according to claim 1 wherein said control locking device comprises a two-armed control rocker, fulcrumed intermediate its ends on a substantially vertical pivot pin fixedly depending from the roof panel, said rocker being directed substantially in the roof sliding direction and having a substantially radial bearing face, control lever rotatably mounted about a horizontally disposed pin extending at right angles to the roof panel sliding direction, a cam surface formed on said lever, resilient means operatively connected to said rocker to bias said bearing face against said cam, lowering of said control lever causing said cam to engage said bearing face to rotate said control rocker to disengage said lock bolts.

3. A sliding roof according to claim 2 in which spring means are operatively connected to said locking rod means biasing the latter in a locking direction, lost motion means provided in said control rocker for each said locking rod means in their direction of motion thus permitting a separate locking effect by each said locking rod means.

4. A sliding roof according to claim 3 wherein said lost motion means comprises elongated holes in said control rocker arms.

5. A sliding roof according to claim 1 wherein said sliding members are provided with oval holes having their longitudinal axes substantially perpendicular to the center line of the roof, screw means passing through said holes to secure said sliding members to said roof panel thereby providing for adjusting the transfers play of said slide members.

6. A sliding roof according to claim 1 wherein a strip of sealing material interposed between said slot of said slide members and said second flange.

7. A sliding roof according to claim 6 in which said strip holds between itself and said second flange upholstery material lining the inner side of the portion of the fixed roof of said vehicle.

8. A sliding roof according to claim 2 wherein said control rocker further comprises a second substantiallly radial bearing face co-acting with a second cam rigid with said control lever, said two cams being substantially identical and symmetrically disposed so as to act on said control rocker in both directions of movement, the bearing faces being disposed in opposition and being shifted to each other so that they engage said cams when said control level is stabilized in its inoperative position.

References Cited
UNITED STATES PATENTS 3,033,608  5/1962  Golde _____ 296—137

FOREIGN PATENTS 975,193  8/1961  Germany.
413,116  12/1934  Great Britain.
436,458  10/1935  Great Britain.
465,339  4/1937  Great Britain.

LEO FRIAGLIA, *Primary Examiner.*

BENJAMIN HERSH, *Examiner.*

C. C. PARSONS, R. SONG, *Assistant Examiners.*